(12) United States Patent
Kebabian

(10) Patent No.: US 6,490,043 B1
(45) Date of Patent: Dec. 3, 2002

(54) POLARIMETRIC SPECTRAL INTENSITY MODULATION SPECTROPOLARIMETER

(75) Inventor: Paul Kebabian, Acton, MA (US)

(73) Assignee: Aerodyne Research, Inc., Billerica, MA (US)

( * ) Notice: Subject to any disclaimer, the term of this patent is extended or adjusted under 35 U.S.C. 154(b) by 0 days.

(21) Appl. No.: 09/504,324

(22) Filed: Feb. 14, 2000

(51) Int. Cl.[7] .............................. G01B 9/02; G01J 3/45
(52) U.S. Cl. ..................................................... 356/453
(58) Field of Search ................................. 356/453, 491

(56) References Cited

U.S. PATENT DOCUMENTS

| | | | |
|---|---|---|---|
| 3,700,334 A | * 10/1972 | Low et al. | 356/453 |
| 5,081,348 A | 1/1992 | Siddiqui | |
| 5,131,742 A | 7/1992 | Schaff | |
| 5,337,146 A | 8/1994 | Azzam | |
| 5,373,359 A | 12/1994 | Woollam et al. | |
| 5,416,588 A | 5/1995 | Ducharme et al. | |
| 5,504,582 A | 4/1996 | Johs et al. | |
| 5,596,411 A | 1/1997 | Fanton et al. | |
| 5,666,201 A | 9/1997 | Johs et al. | |
| 6,421,131 B1 | * 7/2002 | Miller | 356/453 |

OTHER PUBLICATIONS

K. Oka and T. Kato, *Spectroscopic polarimetry with a channeled spectrum*, Optical Society of America, Copyright 1999.

M. Descour, et al., *Demonstration of a computed–tomography imaging spectrometer using a computer–generated hologram disperser*, Applied Optics, vol. 36, No. 16, Jun. 1, 1997.

M. Descour and E. Dereniak, *Computed–tomography imaging spectrometer: experimental calibration and reconstruction results*, Applied Optics, vol. 34, No. 22, Aug. 1, 1995.

* cited by examiner

*Primary Examiner*—Samuel A. Turner
*Assistant Examiner*—Patrick Connolly
(74) *Attorney, Agent, or Firm*—Cesari and McKenna, LLP

(57) ABSTRACT

The invention provides methods and apparatus for encoding information pertaining to the polarimetric state of transversely propagated radiation—for example, electromagnetic waves—as a modulation of the radiation's frequency power spectrum. In a preferred embodiment, suitable for examining light, the radiation passes consecutively through two birefringent media, each having mutually perpendicular fast and slow axes both perpendicular to the propagation axis. The fast axis of the first medium is rotated with respect the fast axis of the second medium to form an acute angle therebetween. The output of the second birefringent medium comprises a complementary pair of interference fringe systems. The power spectrum of each interference system is modulated in a manner characteristic of the polarization state of the radiation. One of the systems is selected by a linear polarizer. The invention is suitable for use in conjunction with a conventional imaging spectrograph and detector.

40 Claims, 4 Drawing Sheets

POLARIMETRIC SPECTRAL INTENSITY MODULATION SPECTROPOLARIMETER

This invention was made with government support under Air Force contract no. F19628-97-C-0040. The government has certain rights in this invention.

BACKGROUND OF THE INVENTION

One well known approach to obtaining quantitative spatially resolved spectral information about a scene under observation is based on forming an image of the scene on the entrance slit of a conventional line-imaging spectrograph having a real-time detector to collect the spectrum that it produces. That spectrum consists of, essentially, a series of images of the slit, each image at a particular wavelength that increases across the spectrum. The intensity variation along a single slit image corresponds to the intensity variation, at a particular wavelength, along a line in the scene. To assemble the spectral image of the entire scene, the line in the scene being imaged onto the slit is continually changed so that a spectral image of the slit is acquired for each location in the scene.

In this way, a spectral image of the entire scene is built up line by line. Scanning of the slit with respect to the scene is done, e.g., by reflecting the incoming light from a mirror that rotates about an axis parallel to the slit. An alternative scanning method, available if the image spectrometer is used on a mobile platform such as an airplane, is to orient the slit (as projected onto the ground) perpendicular to the airplane's ground track; thus, the scanning is obtained from the movement of the platform, without auxiliary optical elements.

In some situations knowledge of the state of linear or circular polarization of the light received from the scene would be a useful accessory to the spectral information. For example, an artificial object, such as a vehicle, generally has a smoother surface than a natural background, giving rise to partial linear polarization of the light reflected from (or emitted by, in the case of infrared radiation) the object. This polarization could be exploited in detecting such an artificial object against a natural background. The valuable information about source object surface roughness and orientation contained in the polarimetric state of received radiation is particularly advantageous for passive sensing applications. However, such polarization information is not available from conventional imaging spectrographs.

SUMMARY OF THE INVENTION

The invention provides methods and apparatus for encoding information SPECTROPOLARIMETER pertaining to the polarimetric state of transversely propagated radiation—for example, electromagnetic—as a modulation of the radiation's frequency power spectrum. In accordance with the method of the invention, a beam of transverse polychromatic radiation is first resolved into two amplitude components having mutually orthogonal polarization vectors. The first component is passed to a first fast channel and the second is component to a first slow channel, thereby delaying propagation of the first and second components by respective first shorter and longer intervals. After leaving the first fast and slow channels, the delayed first and second components are linearly combined so as to form distinct first and second composite fluxes for conveyance to respective second fast and slow channels. The first composite flux contains the delayed first and second components in a first proportion; the second composite flux contains the delayed components combined at a second proportion. The second fast and slow channels delay propagation of the first and second composite fluxes by respective second shorter and longer intervals. A first difference between the first shorter and longer intervals is not equal to a second difference between the second shorter and longer intervals.

Finally, a linear weighted sum is formed from the output of the second fast and slow channels so as to form a modulated signal containing at least one interference fringe system, the features of which characterize the polarimetric state of the original radiation. The polarimetric data may be extracted by examining the fringe system as manifested in the power spectrum of the weighted sum. If a plurality of interference fringe systems is generated, one or more of the interference systems may be selected for examination separately or after combination.

If the spectral scale of the polarization-dependent modulation is narrow compared with the spectral width of the important features of the original radiation, then the modulated spectrum is not significantly degraded compared to that of the original radiation, and the invention has simultaneous spectral and polarimetric capability. Alternatively, if modulation encoding does not adequately preserve the spectrum, a complementary set of such weighted sums—whose total reconstructs the original, unmodulated power spectrum—may be defined by appropriately choosing a plurality of weighting factor pairs, each of which defines a single weighted sum containing the desired polarimetric information; the original power spectrum may be recovered in a separate recovery operation including alternately applying the other weighting factors in the complementary set and summing the plurality of resulting fringe systems.

In a preferred embodiment, appropriate for examining light, herein synonymous with electromagnetic radiation, especially in the visible or infrared range, birefringent media are used to perform the resolving and delaying functions. By definition a birefringent medium has differing values of refractive index, and thus differing values of propagation velocity through the medium, for various electric field orientations of propagating radiation. In such an embodiment, light originating from the scene of interest traveling along a propagation axis is passed to a first birefringent material having mutually perpendicular fast and slow axes both substantially perpendicular to the propagation axis. The first birefringent medium resolves the original light into a first component having a polarization vector coincident with the fast axis and a second component having a polarization vector coincident with the slow axis. The amplitudes of the first and second components are the projections of the original, arbitrarily oriented electric field vector onto the fast and slow axes. Over the components' course through the medium, propagation of the first component is delayed by a first shorter interval and that of the second component by a first longer interval.

The first and second components leave the first birefringent medium and enter a second birefringent medium having mutually perpendicular fast and slow axes both substantially perpendicular to the propagation axis and rotated relative to the first medium's axes so as to form an acute angle therewith. The second birefringent medium in turn resolves each of the delayed first and second components into two subcomponents. One subcomponent produced from each of the delayed first and second components has polarization vector coincident with the second medium's fast axis; the other such subcomponent has polarization vector coincident with the corresponding slow axis. As the four subcomponents traverse the second medium, the two subcomponents whose amplitudes are projections onto the second fast axis of the respective electric field amplitudes of the first and second components are thus delayed by a second shorter interval, which is shorter than a second longer interval, by which the two subcomponents which are similarly projections onto the second slow axis are delayed. A first difference between the first longer and shorter intervals is not equal to a second difference between the second longer and shorter intervals.

The four delayed subcomponents exiting the second medium comprise two complementary interference fringe systems in the power spectrum domain having mutually orthogonal polarizations. A polarizer receiving the four delayed subcomponents applies weighting factors to the subcomponents based on the orientation of the polarizer transmission axis with respect to the second fast and slow axes. The polarizer selects one of the fringe systems, which appear as channeled spectra in the power spectrum of the polarizer output, and suppresses the other. Analysis of the frequency dependence of the power spectrum of the radiation leaving the polarizer renders information about the polarization state of the original radiation, including the degree of polarization, whether the radiation was polarized elliptically or linearly, and the polarization orientation. Rotation of the polarizer transmission axis by 90° selects the complementary fringe system. Orienting the transmission axis alternately between some angle and its 90° complement and summing the respective intensity spectra recovers the unmodulated spectrum of the original radiation, if required. Or, the transmission axis of the polarizer remains stationary and a 90°-twist nematic liquid crystal cell used to determine the portion of the delayed subcomponents received by the polarizer.

The invention is especially advantageous when used in conjunction with a conventional imaging spectrograph and detector, such as are familiar in the prior art. The elongated slit of such a spectrograph enables simultaneous spectral analysis of a column of beams, thereby imparting the ability to collect data describing the variation of polarimetric and spectral properties simultaneously along one spatial dimensional. An element introducing relative motion with respect to the scene of interest, such as a moving sensor platform or a scanning mirror broadens the capability of the invention to include time-sequential two-dimensional imaging.

BRIEF DESCRIPTION OF THE DRAWINGS

The invention description below refers to the accompanying drawings, of which:

FIG. 3 graphically depicts time delays introduced by elements of the apparatus of the invention, wherein

DETAILED DESCRIPTION OF AN ILLUSTRATIVE EMBODIMENT

Figure 1:
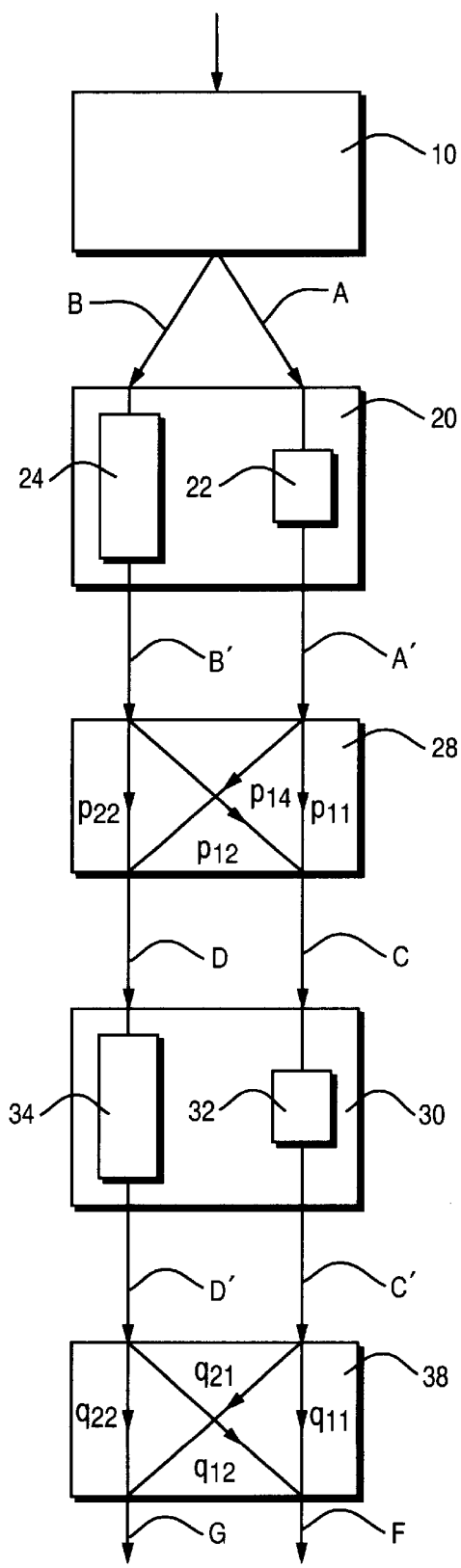
FIG. 1 schematically depicts a generalized apparatus for modulating the power spectrum of radiation in a manner indicative of its polarization state.

With reference to FIG. 1, radiation of interest enters a partitioning element 10, such as a cross-polarized antenna, which resolves the radiation of interest into two amplitude components A and B having mutually orthogonal polarization vectors. A first delay unit 20 having a first fast channel 22 and a first slow channel 24 receives one of the components A and B respectively into each of the channels 22 and 24, so that travel through the delay unit 20 delays propagation of the first and second components by respective first shorter and longer intervals defining a first difference. A first combining unit 28 receives the delayed first and second components A' and B' from the first delay unit 20 and passes them to a second delay unit 30 having a second fast channel 32 and second slow channel 34. The first combining device 28 operates so as to linearly combine the delayed first and second components in a first proportion, with mixing weights $P_{11}$ and $P_{12}$, respectively, to create a first composite flux C for delivery to the second fast channel 32 and in a second proportion, with mixing weights $p_{21}$ and $p_{22}$, to form a second composite flux D for delivery to the second slow channel 34. The mixing weights applied by the first combining unit 28 may be arbitrary but would more likely be chosen in accordance with the principles outlined hereinbelow.

Propagation through the second delay unit 30 introduces a second shorter delay into the output C' of the second fast channel 32 and a second longer delay into the output D' of the second slow channel 34. The second shorter and longer delays define a second difference not equal to the first difference. A second combining unit 38 receives and linearly combines in a predetermined proportion, with mixing weights $q_{11}$ and $q_{12}$ respectively, radiation from each of the channels 32 and 34 of the second delay unit 30, thus allowing mutual interference among the various delayed constituents of radiation. The output F of the combining unit 38 comprises at least one interference system, decoding of which reveals the polarization state of the radiation entering the partitioning element 10, in accordance with the principles outlined hereinbelow. Optionally, the second combining unit 38 also combines radiation from each of the channels of the second delay unit 30 in a second proportion, with mixing weights $q_{21}$ and $q_{22}$, thereby creating a second output G, the outputs F and G together comprising at least one interference system.

The sets of linear mixing weights applied by the first and second combining units 28 and 38 can each be expressed as a 2×2 element mixing matrix. For example, the outputs of the first combining unit 28 can be expressed as the vector resultant of a matrix-vector product:

$$\begin{bmatrix} C \\ D \end{bmatrix} = \begin{bmatrix} p_{11} & p_{12} \\ p_{21} & p_{22} \end{bmatrix} \begin{bmatrix} A' \\ B' \end{bmatrix}$$

The predetermined values of these mixing matrices corresponding to the first 28 and second 38 combining units dictate whether the apparatus can generate complementary fringe system outputs. It can be shown that if each mixing matrix is a rotation matrix (i.e., a unitary real matrix with determinant equal to one), then the power spectra of the output F and G of the apparatus are related in a complementary fashion, even if the rotation angle of the mixing matrix of the first combining unit 28 is not related to the o rotation angle of the mixing matrix of the second combining unit 38. Because of this complementary relationship between power spectra, adding the two spectra together causes the modulations induced by the apparatus to cancel completely, allowing recovery of the original power spectrum of the radiation entering the apparatus. If, on the other hand, these mixing matrices are singular, the outputs F and G produce identical interference systems, thus destroying the complementarity relationship. Arbitrary mixing matrices will produce various interference fringe systems for outputs F and G, but also without the property of complementarity.

The spectropolarimetric method of the present invention is generalizable beyond analysis of transversely propagated radiation. The polarimetric state describes the coherence characteristics between two (or more) generic time domain signals, and the present invention can, in principle, be applied to analyze such signals. (For baseband signals amenable to time sampling, such coherence determination may be performed by digital signal processing, without appeal to the method of the invention.) The present invention is most advantageously applied to high-frequency electromagnetic radiation for which direct temporal amplitude sampling is impractical and for which ergodic power spectrum sampling must thus suffice.

Figure 2:
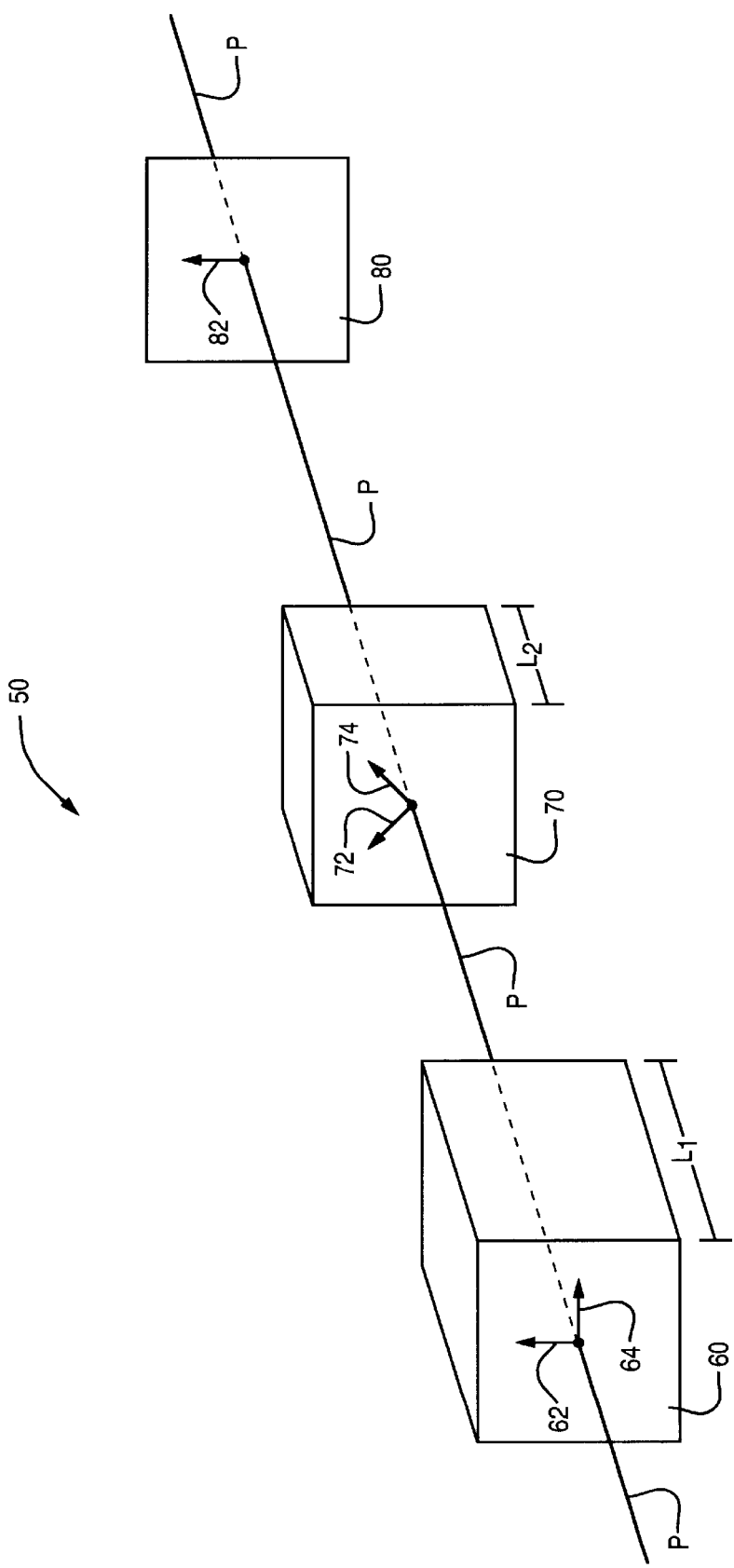
FIG. 2 schematically depicts a modulator assembly of the invention adapted for use with optical radiation.

With reference to FIG. 2, a preferred embodiment, configured for use with optical radiation, of the modulator assembly 50 of the invention comprises a first uniaxial birefringent medium 60 oriented so that its mutually perpendicular fast axis 62 and slow axis 64 are both perpendicular to the propagation axis P of a beam of light of interest. A second uniaxial birefringent medium 70 also has mutually perpendicular fast 72 and slow 74 axes both perpendicular to the propagation axis P of the beam. The fast axis 72 of the second medium 70 forms a 45° angle with the fast axis 62 of the first medium 60. The first 60 and second 70 birefringent media have respective lengths $L_1$ and $L_2$ along the propagation axis P. A polarizer 80 has a transmission axis 82 oriented along the fast axis 62 of the first medium 60.

Figure 3A:
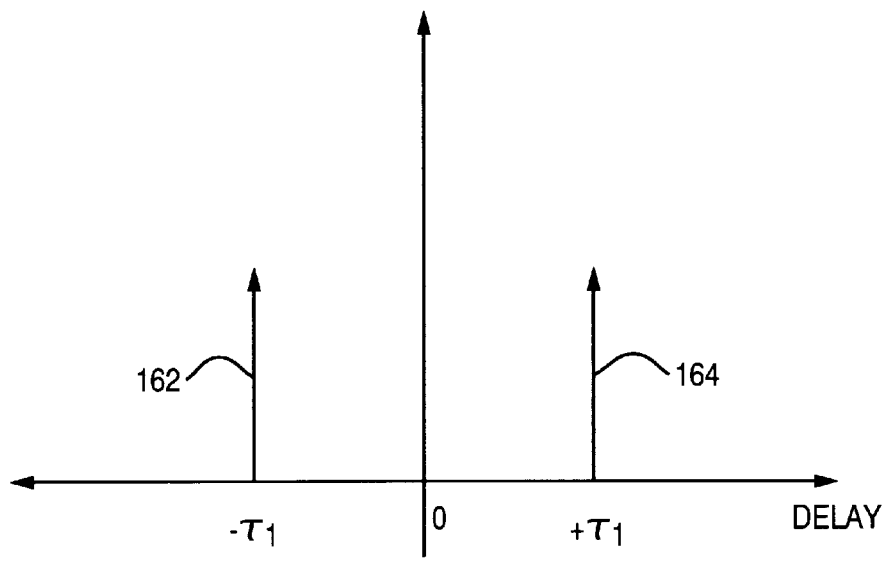
FIG. 3A shows delays in the first and second components due to traversing the first birefringent medium.

Consider an impulse beam of light, having an arbitrarily oriented polarization vector, incident into the front surface of the first birefringent medium 60. By definition a uniaxial birefringent medium possesses two distinct indices of refraction as resolved along orthogonal fast and slow axes. Thus by nature such a medium 60 or 70 imposes a respectively shorter or longer propagation delay upon a vectorial component of the beam defined by the resolution of the beam's polarization with respect to each of the fast and slow axes. With reference to FIG. 3A, a component 162 polarized along the first fast axis 62 emerges from the first medium 60 at time $-\tau_1$, and a component 164 polarized along the first slow axis 64 emerges at time $+\tau_1$, with respect to an origin defined at a first average time delay, where $\tau_1$ is defined by $$\tau_1 = L_1 \Delta n_1 / 2c,$$

and c is the speed of light in vacuo and $\Delta n_1$ is the difference between the refractive indices of the birefringent crystal. Since the propagation axis P is perpendicular to both the first fast and slow axes 62 and 64, the polarizations of the delayed transmitted waves are unchanged but remain as resolved from the incident beam of light along the axes 62 and 64.

Figure 3B:
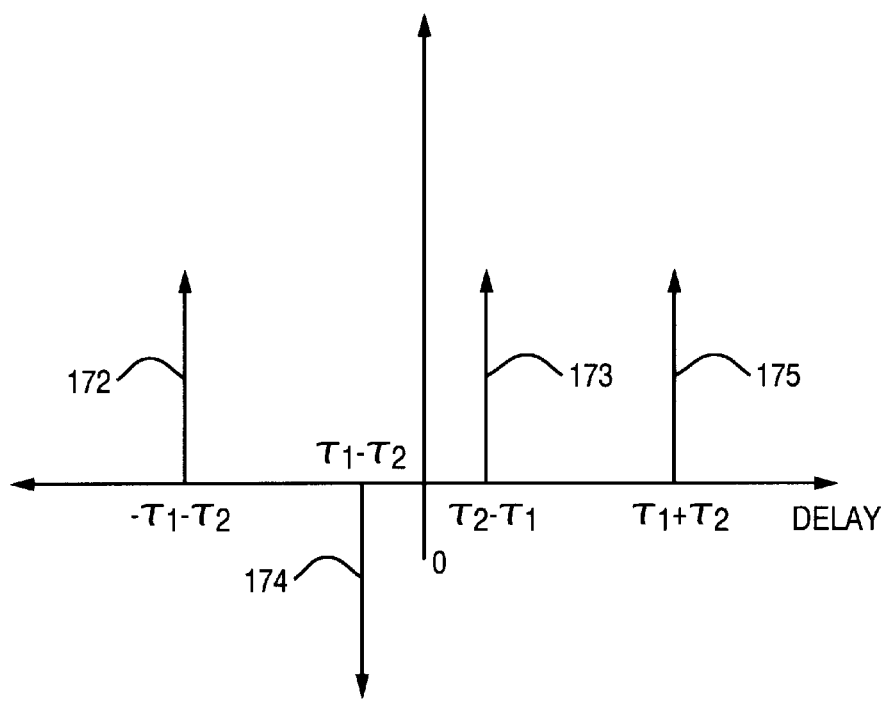
FIG. 3B shows delays in the four subcomponents due to traversing the first and second birefringent media in series.

The delayed components 162 and 164 then enter the second medium 70. Because the fast axis 72 of the second medium 70 is rotated with respect to that 62 of the first medium 70, each of the delayed components 162 and 164 comprises subcomponents resolved against the second fast 72 and slow 74 axes. Upon entering the second medium 70, the component 162 is thus resolved into a subcomponent 172 polarized along the second fast axis 72 and a subcomponent 173 polarized along the second slow axis 74. The delayed component 164 is similarly resolved into subcomponents 174 and 175. Upon exiting the second birefringent medium 70, each of the subcomponents has acquired an additional differential time delay of $\pm\tau_2 = \pm L_2 \Delta n_2/2c$ with respect to an origin defined at a second average time delay, where $\tau_2 \neq \tau_1$. Thus, the subcomponents 172, 173, 174 and 175 leave the second medium 70 at time delays of $-(\tau_1+\tau_2)$, $-(\tau_1-\tau_2)$, $(\tau_1-\tau_2)$ and $(\tau_1+\tau_2)$, respectively, relative to an overall average time delay, which defines the origin of the delay axis in FIG. 3B. (The impulses are shown to all be of the same height; the actual amplitudes are proportional to the respective amplitudes of the projection of the incident beam's polarization onto the fast and slow axes.)

In the general case, the beam entering the first birefringent medium 60 has a nonzero polarization vector component along each the first fast 62 and slow 64 axes, so that the four distinct subcomponents 172, 173, 174 and 175 each are resolved as nonzero elements along the transmission axis 82 of the polarizer 80, coinciding with the first fast axis 62. Thus, the output of the polarizer 80 comprises four discernible constituents each corresponding temporally to one of the subcomponents 172, 173, 174 and 175. The invention exploits mutual interference in the power spectrum domain among the four constituents to encode the polarization state of the beam of light.

Disregarding electric field orientation, the system function representing the total electric field output of the polarizer 80 in series with the two birefringent media 60 and 70 is obtained by taking the Fourier transform of the impulse response comprised of a linear mixture of the four subcomponents 172, 173, 174 and 175:

$$E(v) \propto \int_{-\infty}^{\infty} \left[ \sum_{i=1}^{2} c_{i,1}\delta(t-\kappa_i) + c_{i,2}\delta(t-\kappa_i) \right] \exp(-2\pi j v t) dt$$

$$E(v) \propto \sum_{i=1}^{2} a_i(\cos 2\pi v \kappa_i + b_i \sin 2\pi v \kappa_i),$$

in which $\delta(t)$ is the Dirac delta function, v is the optical cycle frequency of the incident radiation, $K_1=\tau_1+\tau_2$ and $K_2=\tau_1-\tau_2$. The intensity is $$I \propto |E|^2.$$

The intensity power spectrum will, in general, thus be sinusoidally modulated by modes with the following relative beat frequencies (modulation cycles/bandwidth): DC (no modulation, i.e., an offset), $2(\tau_1-\tau_2)$, $2(\tau_1+\tau_2)$ $2\omega(\tau_1+\tau_2)$, $2\tau_1 2\omega\tau_1$ and $2\tau_2 2\omega\tau_2$. These modulation modes are also known in the interferometry art as channeled spectra.

Interference giving rise to these modes (channeled spectra) occurs only between those delayed impulses with mutually nonorthogonal polarization vectors. (Interference effects do not occur between cross-polarized waves). The placement of the linear polarizer 80 after the second medium 70 at the orientation described hereinabove defines a mutually non-orthogonal orientation plane onto which each of the electric fields of the four delayed subcomponents 172, 173, 174 and 175 has a nonzero vector projection, allowing their "mixing" and thus mutual interference between all pairs. (If the transmission axis 82 of the linear polarizer 80 is aligned perpendicular or, as in this exemplary embodiment, parallel to the fast axis 62 of the birefringent medium 60, the $2\omega\tau_1 2\tau_1$ modulation mode is not operative.)

A Mueller matrix-Stokes vector formulation of the modulator assembly 50 provides another framework for describing the operation of the invention. The derivation relates the Stokes output of the spectral Mueller matrix describing the modulator assembly 50 to the incident Stokes vector.

The Stokes parameters are a method of characterizing the ergodic average (i.e., the time average over many cycles of the principal frequency components of the wave) of partially polarized radiation, and thus its conventionally observable polarization state. The vector defining the Stokes parameters is $$\begin{bmatrix} I \\ Q \\ U \\ V \end{bmatrix} = \begin{bmatrix} E(a_1^2 + a_2^2) \\ E(a_1^2 - a_2^2) \\ E(2a_1 a_2 \cos\delta) \\ E(2a_1 a_2 \sin\delta) \end{bmatrix},$$

wherein $a_1$ and $a_2$ are the real-valued instantaneous orthogonal electric field amplitudes, $\delta$ is the phase lag between instantaneous field realizations, and the operator $E(\ )$ is the ergodic time-average expectation. The first Stokes parameter $I$ is the conventional radiation intensity.

The Mueller matrix or scattering matrix conveniently describes the transformations on the Stokes vector as partially polarized radiation propagates through a system. The first Stokes parameter in the product of the Mueller matrix for the modulator assembly 50 and the Stokes vector for the incident radiation expresses the observable spectral intensity modulation introduced by the modulator assembly 50.

The overall Mueller matrix for the modulator assembly 50 can be evaluated from the matrix product of the respective Mueller matrices for the constituent elements: the first and second birefringent media 50 and 60 and the linear polarizer 80. A uniaxial birefringent medium behaves as an orientationally selective retarder by virtue of its orthogonal fast and slow axes. Such a delay element contributes a frequency-dependent phase shift angle $\phi$ expressive of the difference between the propagation delays imposed on the polarization components of the incident waves as resolved with respect to the respective fast and slow axes. For a birefringent medium having a refractive index difference $\Delta n$ between the slow and fast axes, and length L along the propagation axis, $$\phi = \frac{2\pi v \Delta n L}{c}.$$

For a birefringent medium having fast axis oriented parallel to the system reference axis, against which $a_1$ is defined, the corresponding Mueller matrix is $$M_{uniaxial}(\phi) = \begin{bmatrix} 1 & 0 & 0 & 0 \\ 0 & 1 & 0 & 0 \\ 0 & 0 & \cos\phi & -\sin\phi \\ 0 & 0 & \sin\phi & \cos\phi \end{bmatrix}.$$

Rotation of the second birefringent medium relative to the system reference axis by an angle $\beta$ can be represented by pre- and post-multiplication of that element's nominal Mueller matrix by the appropriate rotational Mueller matrix:

$$M_{rotation}(\beta) = \begin{bmatrix} 1 & 0 & 0 & 0 \\ 0 & \cos 2\beta & \sin 2\beta & 0 \\ 0 & -\sin 2\beta & \cos 2\beta & 0 \\ 0 & 0 & 0 & 1 \end{bmatrix}.$$

The effect of a linear polarizer with transmission axis rotated by an angle $\theta$ relative to the system reference axis can be described by Mueller matrix $$M_{polarizer}(\theta) = \frac{1}{2}\begin{bmatrix} 1 & \cos 2\theta & \sin 2\theta & 0 \\ \cos 2\theta & \cos^2 2\theta & \sin 2\theta \cos 2\theta & 0 \\ \sin 2\theta & \sin 2\theta \cos 2\theta & \sin^2 2\theta & 0 \\ 0 & 0 & 0 & 0 \end{bmatrix}.$$

The Mueller matrix of the modulator assembly 50 is thus $$M_{modulator} = M_{polarizer}(\theta) \cdot M_{rotation}(-\beta) \\ M_{uniaxial}(\phi_2) M_{rotation}(\beta) M_{uniaxial}(\phi_1),$$

wherein $\phi_1$ and $\phi_2$ are as defined above for the first and second birefringent media, respectively. If $\beta=45°$ and $\theta=0°$, as for the exemplary embodiment described above, then solving for the first Stokes parameter yields $$I_v(\phi_1, \phi_2) = \frac{1}{4}[I \quad Q \quad U \quad V] \begin{bmatrix} 2 \\ 2\cos\phi_2 \\ \cos(\phi_1 - \phi_2) - \cos(\phi_1 + \phi_2) \\ \sin(\phi_1 + \phi_2) - \sin(\phi_1 - \phi_2) \end{bmatrix}.$$

The elements of the column vector express the four sinusoidal "fringe" modes modulating the intensity power spectrum $I_v$ output from the modulator assembly 50: the DC-offset (nonmodulated) mode, a sinusoidal "carrier" mode corresponding to the $\phi_2$ term, with sum and difference frequency (upper and lower "sidebands") modes corresponding to the $\phi_2+\phi_1$ and $\phi_2-\phi_1$ terms, respectively. The periodicity of a modulation mode in bandwidth (Hz) per modulation cycle is $$\Delta v = \frac{c}{\Delta n L}.$$

Thus, assuming that the two serial birefringent media have a common value of $\Delta n$, the periodicities of the three non-DC sinusoidal carrier modes are $$\Delta v_{carrier} = \frac{c}{\Delta n L_2}$$

$$\Delta v_{lower} = \frac{c}{\Delta n (L_2 - L_1)}$$

$$\Delta v_{upper} = \frac{c}{\Delta n (L_2 + L_1)}.$$

Note that for the given orientation of the elements in the assembly 50, the carrier mode frequency is determined by the second birefringent medium 70.

For an otherwise white optical spectrum incident upon the modulator assembly 50, sinusoidal variations as a function of v appear across the intensity power spectrum of the radiation exiting the polarizer 80. For a non-white incident spectrum, the variations do not have a sinusoidal appearance but are nonetheless described by the measurement equation derived above.

Appropriate signal processing of the observable modulated intensity power spectrum of the output of the linear polarizer 80 allows recovery of the original radiation's intensity spectrum and also deduction of its full elliptical polarization states (Stokes vector). Several methods for retrieving the Stokes vector, and also the conventional intensity spectrum, from the observable modulated intensity spectrum are accessible by those skilled in the art.

If the signal processing is to entail explicit comparison of the observations with the total frequency dependence as expressed above, the data in the spectrum must first be in the form of intensity as a function of v, where $\lambda=2\pi c/\omega \lambda=c/v$. The most straightforward approach to the signal processing is to establish the correspondence between position in the spectrum and frequency, thus giving data of the form $I(\omega_n)$ $I(v_n)$, in which n denotes the position in the image. In general, this experimental dependence will not have uniformly spaced samples as a function of frequency, but it can be converted to a uniformly spaced function by interpolation. The polarimetric information is then deduced from the Fourier transform of the data $I(v_n)$, evaluated at modulation beat frequencies corresponding to differential time delays $\tau_2$, $\tau_1+\tau_2$ and $\tau_1-\tau_2$. This procedure works best when the spacing of the fringes of the channeled spectra are closely spaced compared to the width encompassed by the complete spectrum and also compared to the width of spectral features of the radiation of interest.

This approach is conceptually straightforward but not necessarily the most computationally efficient approach to handling the measured data. Also, in the case of mid-infrared observations, the limited availability of suitable birefringent materials for the waveplates means that the assumption of large $\tau$ may be invalid. In these cases, the data may be processed by more general curve-fitting techniques, based on the fact that the expected modulation (as a function of v) imposed by the modulator assembly 50 is known. This curve fitting approach also may take advantage of a priori knowledge of the spectrum of the radiation being observed.

The foregoing discussion specified that the media 60 and 70 are made of uniaxial birefringent materials, having values of refractive index identical for two of three orthogonal axes. Biaxial birefringent media, for which the refractive indices differ for all three orthogonal axes (although typically the difference between two of the values is small), could also be used for the media 60 and 70. However, using uniaxial media obviates several practical difficulties.

The birefringent media 60 and 70 preferably each have optical depth substantially uniform therethrough across the area defined by the beam, along the propagation axis, so that beam coherence is preserved. Also, the delays introduced by the media should be minimally dispersive or well-tempered function of frequency over the frequency range of interest, in order to produce sinusoidal fringe patterns and simplify interpretation of the modulated spectrum. The required disparity between $\tau_1$ and $\tau_2$ depends on the desired application; smaller disparities require more sensitive data analysis capability. Appropriate values of $\tau_1$ from greater than $10\tau_2$ to less than $0.1\tau_2$ are conceivable. This difference is effected by using different materials for the first 60 and second 70 media, by using different lengths, measured along the propagation axis P, of the same material, or both.

The substantial perpendicularity of the first 62 and second 72 fast and the first 64 and second 74 slow axes to the propagation axis P typically encompasses deviations of several degrees from strict perpendicularity. Off-axis propagation through one of the is media 60 and 70 is a principle source of spurious intensity spectrum modulation, which may interfere with interpreting the serviceable, intentionally introduced modulation.

Radiation traveling off-axis suffers differential refraction due to the two distinct refractive indices. The spurious interference is insignificant for small off-axis angles. However, the beam under analysis should typically be beamformed to be relayed into the media with minimal convergence or divergence. Classic texts, such as *Principles of Optics* by Born and Wolf, provide detailed discussion of this effect.

The polarizer 80 should have sufficiently uniform properties along the propagation axis P over the area defined by the beam to preserve beam coherence. For infrared sensors, wire grid polarizers, fabricated by depositing metal within parallel grooves etched upon transparent planar substrates such as ZnSe, are suitable.

When the frequency range of interest permits, a 90°-twist nematic liquid crystal cell, such as is well known to those of skill in the art, is especially useful in combination with, and preceding, the polarizer 80.

Such an electronically switchable liquid crystal cell serves to alternately select two complementary fringe systems for transmission through the subsequent polarizer 80, facilitating subsequent recovery of the original power spectrum, as discussed above.

In its off state, the liquid crystal cell behaves as an achromatic rotator. Strongly birefringent, the liquid crystal has fast and slow axes that rotate through a 90° angle along the length of the cell, following the twist of the liquid crystal directors. In its on state, the liquid crystal directors align to eliminate the twist continuity and thus the polarization selectivity. The liquid crystal-polarizer combination has a faster switching speed compared to a rotating linear polarizer and is also comparatively advantageous in that the radiation emanating from the modulator to downstream components and detectors always maintains a singular linear polarization orientation, thereby reducing calibration challenges due to polarization selectivity of such downstream elements.

Figure 4:
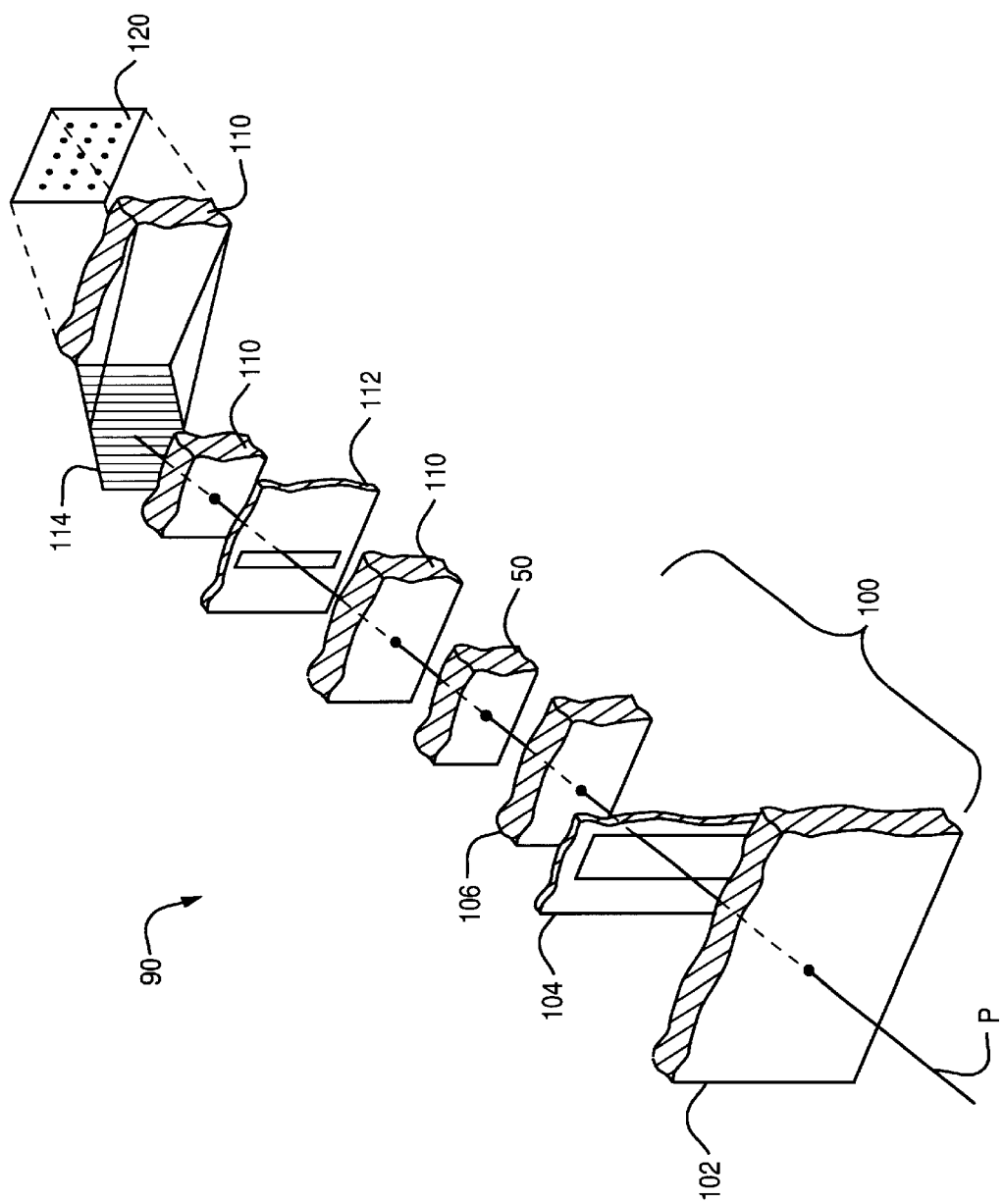
FIG. 4 schematically depicts a spectrograph incorporating the modulator assembly of the invention.

In a preferred embodiment, the modulator assembly 50 of the invention is incorporated into an otherwise-conventional slit-based line imaging spectrometer. The is modulator assembly 50 augments the normal spectrographic function with full elliptical Stokes polarimetry capability. With reference to FIG. 4, input imaging optics 100 for such an augmented spectrometer 90 typically comprises a light collecting primary imaging optic 102, a field-stop 104 and collimating lens 106. A beam of visible or infrared light propagates through the input imaging optics 100 into the modulator assembly 50 of the invention. The output of the modulator assembly 50 enters the first of the re-imaging optical elements 110, which produce two principal focal planes. A spectrometer entrance slit 112 is located at the first focal plane. A diffraction grating 114, or other spectrum-channelizing device, is placed in the collimated beam region between the first and final focal planes of the re-imaging optics 110. The line image of the slit, spectrally dispersed along a direction perpendicular to the slit, is projected from the re-imaging optics 110 onto a photosensitive areal detector array 120.

In operation, the beam gathered by the input imaging optics 100 is relayed as a collimated beam through the modulator assembly 50, which impresses polarization-dependent modulation modes upon the intensity spectrum resolved for each of the discrete contiguous pixels which collectively define a column corresponding to the slit. The output of the polarizer 80 is then analyzed by the remaining conventional elements 110, 114 and 120. With each readout of the photosensitive areal detector array 120, a spatially resolved modulated spectral image of the one-dimensional spectrometer slit 112 is acquired. Appropriate signal processing of a pixel's modulated intensity spectrum allows determination of its full elliptical polarization state. Altering the orientation of the polarizer transmission axis 82 in coordination with data collection also permits recovery of the unmodulated intensity spectrum.

To achieve spatial imaging in the direction perpendicular to the slit, sensor platform motion translates the slit 112 across object space in "pushbroom" fashion. Alternately, for stationary platforms, a scanning mirror (not shown) may be employed. Thus, assuming simultaneous synchronized sampling by all the elements in the photosensitive areal detector array 120, the complete sensor 90 performs simultaneous spectropolarimetric one-dimensional line imaging, whereas spatial imaging in the second, orthogonal direction is performed in a time-sequential manner. Or, the functions of the grating 114 and the conventional areal detector array 120 could be performed instead by a color-differentiating photosensitive areal detector array. In this case, the second spatial dimension could be covered simultaneously with the spectral acquisition. Another option is to incorporate the modulator assembly 50 of the invention in a tomographic area imaging spectrometer, such as is discussed by Descour et al. (See, e.g., Applied Optics, 36, 16 [1997] and ibid, 24, 22 [1995].)

EXAMPLE

Visible light from a target of interest, emitting at nearly uniform intensity over its face, linearly polarized over one half and unpolarized over the other half, was passed consecutively through a modulator assembly 50 of the invention. The modulator assembly 50 comprised two quartz waveplates 50 and 60, the first having $L_1=2.0$ mm and the second having $L_1=0.4$ mm, and a linear polarizer 80, the elements of the modulator assembly 50 being assembled as shown in FIG. 2. A lens having focal length equal to 3 mm coupled light leaving the polarizer 80 into a circular bundle of 25 optic fibers, each 50 microns in diameter. Light leaving each of the bundle fibers formed an image on an entrance slit of a low-dispersion-grating spectrograph. The spectral data collected for each row (corresponding to one of the fibers) was analyzed by the Fourier transform method described above. The calculated degree of polarization was reproduced as a function of position over the face of the target to within the limits of an image comprising 25 pixels.

Calcite is also useful for the media 60 and 70 in visible light applications. For infrared frequency ranges around 10-$\mu$m, crystals of cadmium sulfide, having refractive indices approximately equal to 2.2 and differing by about 0.01, are practical. Lengths $L_1=50$ mm and $L_2=5$ mm give sufficient disparity between the delay differences for such crystals. Cadmium selenide, sapphire and silver gallium sulfide are also suitable materials for infrared sensing applications.

It will therefore be seen that the foregoing represents a highly extensible and advantageous approach to augmenting spectrometry with polarimetry, especially in electromagnetic signals. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for modulating an intensity power spectrum of radiation, in a manner indicative of the polarization state of the radiation, the apparatus comprising:
   a. a partitioning device for resolving the radiation into a first component having a first polarization vector and a second component having a second polarization vector, the first and second polarization vectors being mutually perpendicular;
   b. a first delay unit having a first fast channel for receiving the first component and a first slow channel for receiving the second component, the first fast channel delaying propagation of the first component by a first shorter delay, the first slow channel delaying propagation of the second component by a first longer delay, a first difference being defined between the first shorter and longer delays;
   c. a first combining unit for linearly combining the delayed first and second components in a first proportion into a first composite flux and in a second proportion into a second composite flux;
   d. a second delay unit having a second fast channel and a second slow channel, the second fast channel delaying propagation of the first composite flux by a second shorter delay, the second slow channel delaying propagation of the second composite flux by a second longer delay, the second shorter and longer delays defining a second difference, not equal to the first difference; and
   e. a second combining unit for linearly combining the delayed first and second composite fluxes so as to allow their mutual interference, thereby generating at least one interference system characteristic of the polarization state.

2. The apparatus of claim 1 further comprising a mechanism for dispersing the at least one interference system into an interference-modulated power spectrum.

3. The apparatus of claim 1 wherein the mutual interference generates a plurality of interference systems, the second combining implement being configured to select and transmit one of the plurality of interference systems.

4. The apparatus of claim 1 wherein the second combining unit generates an output, the mutual interference generating a plurality of interference systems, further comprising a selecting implement for receiving the plurality of interference systems and for selecting therefrom and transmitting one of the plurality of interference systems.

5. The apparatus of claim 4 wherein the selecting implement is configured to transmit alternately each of at least two of the plurality of interference systems.

6. The apparatus of claim 5 further comprising a mechanism for dispersing the transmitted one of the plurality of interference systems into an interference-modulated intensity power spectrum, the mechanism for dispersing being configured to manifest alternately each of the at least two of the plurality of interference systems, in cooperation with the selecting implement, and to sum the systems, thereby recovering the intensity spectrum.

7. An apparatus for modulating an intensity power spectrum of radiation in a manner indicative of the polarization state of the radiation, the radiation traveling along a propagation axis, the apparatus comprising:
   a. a first resolving implement for resolving the radiation into a first component having a first polarization vector and a second component having a second polarization vector, the first and second polarization vectors being mutually perpendicular;
   b. a first delay unit for delaying propagation of the first component by a first delay and propagation of the second component by a second delay, the first delay being shorter than the second delay, a first difference being defined between the first and second delays;
   c. a second resolving implement
      i. for resolving the delayed first component into a third component having a third polarization vector and a fourth component having a fourth polarization vector, the third and fourth polarization vectors being mutually perpendicular, the third polarization vector being rotated with respect to the first polarization vector so as to form an acute angle therewith and ii. for resolving the delayed second component into a fifth component having a fifth polarization vector and a sixth component having a sixth polarization vector, the fifth and sixth polarization vectors being mutually perpendicular;

d. a second delay unit for delaying propagation of the third and fifth components by a third delay and propagation of the fourth and sixth components by a fourth delay, the third delay being shorter than the fourth delay, the third and fourth delays defining a second difference unequal to the first difference;

e. a combining implement for allowing mutual interference among the delayed third, fourth, fifth and sixth components, thereby generating at least one interference system characteristic of the polarization state; and f. a selecting implement for selecting and transmitting one of the at least one interference system.

8. The apparatus of claim 7 wherein a first birefringent medium having a mutually perpendicular first fast axis and first slow axis, both substantially perpendicular to the propagation axis, constitutes the first resolving implement and the first delay unit, the first polarization vector coinciding with the first fast axis and the second polarization vector coinciding with the first slow axis.

9. The apparatus of claim 8 wherein a second birefringent medium having a mutually perpendicular second fast axis and second slow axis, both substantially perpendicular to the propagation axis, constitutes the second resolving implement and the second delay unit, the third and fifth polarization vectors coinciding with the second fast axis and the fourth and sixth polarization vectors coinciding with the second slow axis, the second fast axis being rotated with respect to the first fast axis so as to form an acute angle therewith.

10. The apparatus of claim 9 wherein a linear polarizer having a transmission axis constitutes the combining and selecting implements.

11. The apparatus of claim 7 wherein the mutual interference generates a plurality of interference systems, the apparatus further comprising a mechanism for controlling the selecting implement so as to alternately select from the plurality of interference systems.

12. The apparatus of claim 11 wherein the plurality of interference systems comprises a complementary pair of interference systems, the apparatus comprising a switchable 90°-twist nematic liquid crystal cell preceding a linear polarizer, configured to receive the delayed third, fourth, fifth and sixth components, and a linear polarizer configured to transmit one of the at least one interference system, the liquid crystal cell and polarizer together constituting the combining and selecting implements.

13. The apparatus of claim 11 further comprising a mechanism for dispersing the transmitted one of the plurality of interference systems into an interference-modulated intensity spectrum, the mechanism for dispersing being configured to manifest alternately each of at least two of the interference systems, in cooperation with the mechanism for controlling the selecting implement, and to sum the at least two interference systems, thereby recovering the intensity spectrum.

14. The apparatus of claim 7 further comprising a mechanism for dispersing the transmitted one of the at least one interference system into an interference-modulated intensity spectrum.

15. The apparatus of claim 14 wherein the mechanism for dispersing the transmitted one of the at least one interference system is a spectrograph.

16. The apparatus of claim 15 wherein the spectrograph has an entrance slit and further comprising focusing means for focusing the transmitted one of the at least one interference system onto the entrance slit.

17. An apparatus for modulating an intensity spectrum of light, in a manner indicative of the polarization state of the light, the light traveling along a propagation axis, the apparatus comprising:

a. a first birefringent medium having a mutually perpendicular first fast axis and first slow axis, both substantially perpendicular to the propagation axis, the first birefringent medium i. resolving the light into a first component having a first polarization vector coincident with the first fast axis and a second component having a second polarization vector coincident with the first slow axis and ii. delaying propagation of the first component by a first delay and propagation of the second component by a second delay, the first delay being shorter than the second delay, a first difference being defined between the first and second delays;

b. a second birefringent medium having a mutually perpendicular second fast axis and second slow axis, both substantially perpendicular to the propagation axis, the second fast axis being rotated with respect to the first fast axis so as to form an acute angle therewith, the second birefringent medium i. resolving the delayed first component into a third component having a third polarization vector coincident with the second fast axis and a fourth component having a fourth polarization vector coincident with the second slow axis, ii. resolving the delayed second component into a fifth component having a fifth polarization vector coincident with the second fast axis and a sixth component having a sixth polarization vector coincident with the second slow axis and iii. delaying propagation of the third and fifth components by a third delay and propagation of the fourth and sixth components by a fourth delay, the third delay being shorter than the fourth delay, the third and fourth delays defining a second difference unequal to the first difference, the delayed third, fourth, fifth and sixth components constituting a pair of complementary interference systems characteristic of the polarization state;

c. a linear polarizer for receiving the delayed third, fourth, fifth and sixth components, the polarizer having a transmission axis oriented to select and transmit one of the pair of interference systems,.

18. The apparatus of claim 17 further comprising mechanism for alternating the transmission axis between a first orientation and a second orientation perpendicular to the first orientation.

19. The apparatus of claim 17 further comprising a mechanism for detecting the transmitted one of the pair of interference systems.

20. The apparatus of claim 19 wherein the mechanism for detecting the transmitted one of the pair of interference systems is a spectrograph.

21. The apparatus of claim 20 wherein the spectrograph has an entrance slit and further comprising focusing apparatus for focusing the transmitted one of the pair of interference systems onto the entrance slit.

22. A method of modulating an intensity spectrum of radiation having a polarization state, in a manner indicative of the polarization state, the method comprising the steps of:

a. resolving the radiation into a first component having a first polarization vector and a second component having a second polarization vector, the first and second polarization vectors being mutually perpendicular;

b. delaying propagation of the first component by a first shorter delay and propagation of the second component by a second longer delay, a first difference being defined between the shorter and longer delays;

c. combining the delayed first and second components in a first proportion into a first composite flux and in a second proportion into a second composite flux;

d. delaying propagation of the first composite flux by a second shorter delay and propagation of the second composite flux by a second longer delay, the second shorter and longer delays defining a second difference, not equal to the first difference;

e. combining the delayed first and second composite fluxes so as to allow their mutual interference, thereby generating at least one interference system characteristic of the polarization state.

23. The method of claim 22 further comprising the step of dispersing the at least one interference system into an interference-modulated power spectrum.

24. The method of claim 22 wherein the mutual interference generates a plurality of interference systems, the step of combining the delayed first and second composite fluxes effecting selection and transmission of one of the plurality of interference systems.

25. The method of claim 22 wherein the mutual interference generates a plurality of interference systems, further comprising the steps of:

a. selecting one of the plurality of interference systems from the delayed first and second composite fluxes; and b. transmitting the selected one of the plurality of systems.

26. The method of claim 22 wherein the mutual interference generates a plurality of interference systems, further comprising the steps of:

a. alternately selecting each of at least two systems from the plurality of interference systems; and b. for each alternate selection, transmitting the respective selected system.

27. The method of claim 26 further comprising the steps of:

a. dispersing each of the at least two respective transmitted systems into an interference-modulated intensity spectrum in cooperation with the step of alternately selecting each of at least two systems; and b. summing the at least two interference-modulated intensity spectra, thereby recovering the intensity spectrum.

28. A method of modulating an intensity spectrum of radiation having a polarization state in a manner indicative of the polarization state, the radiation traveling along a propagation axis, the method comprising the steps of:

a. resolving the radiation into a first component having a first polarization vector and a second component having a second polarization vector, the first and second polarization vectors being mutually perpendicular;

b. delaying propagation of the first component by a first delay and propagation of the second component by a second delay, the first delay being shorter than the second delay, a first difference being defined between the first and second delays;

c. resolving the delayed first component into a third component having a third polarization vector and a fourth component having a fourth polarization vector, the third and fourth polarization vectors being mutually perpendicular, the third polarization vector being rotated with respect to the first polarization vector so as to form an acute angle therewith;

d. resolving the delayed second component into a fifth component having a fifth polarization vector and a sixth component having a sixth polarization vector, the fifth and sixth polarization vectors being mutually perpendicular;

e. delaying the propagation of the third and fifth components by a third delay and propagation of the fourth and sixth components by a fourth delay, the third delay being shorter than the fourth delay, the third and fourth delays defining a second difference, the second difference being unequal to the first difference;

f. combining the delayed third, fourth, fifth and sixth components so as to allow mutual interference, thereby generating at least one interference system characteristic of the polarization state; and g. selecting and transmitting one of the at least one interference system.

29. The method of claim 28 wherein steps a and b are performed by passing the beam of light through a birefringent medium having a fast axis coinciding with the first polarization vector and a slow axis coinciding with the second polarization vector.

30. The method of claim 28 wherein steps c through e are performed by passing the delayed first and second components through a birefringent medium having a fast axis coinciding with the third and fifth polarization vectors and a slow axis coinciding with the fourth and sixth polarization vectors.

31. The method of claim 28 wherein steps f and g are accomplished by passing the third, fourth, fifth and sixth components simultaneously through a linear polarizer having a transmission axis.

32. The method of claim 31 wherein the mutual interference generates a complementary pair of interference systems, the step of selecting and transmitting comprising alternating the transmission axis between a first orientation and a second orientation perpendicular to the first orientation, thereby alternately selecting from the pair of interference systems.

33. The method of claim 28 further comprising the step of dispersing the transmitted one of the at least one interference system into an interference-modulated intensity spectrum.

34. The method of claim 33 wherein the step of dispersing is performed by passing the transmitted one of the at least one interference system through a spectrograph.

35. The method of claim 28 wherein the mutual interference generates a plurality of interference systems, the step of selecting and transmitting comprising alternately selecting each of at least two of the plurality of interference systems.

36. The method of claim 35 further comprising the steps of:

a. dispersing the transmitted one of the plurality of interference systems into an interference-modulated intensity spectrum, in cooperation with the alternate selection; and b. summing the at least two of the plurality of interference systems, thereby recovering the intensity spectrum.

37. The method of claim 23 further comprising the step of determining the polarization state of the radiation from the interference-modulated intensity spectrum.

38. The method of claim 37 wherein the step of determining the polarization state from the interference-modulated intensity spectrum comprises curve fitting.

39. The method of claim 37 wherein the step of determining the polarization state comprises transforming the interference-modulated intensity spectrum to data samples uniformly spaced in optical frequency.

40. The method of claim 37 wherein the step of determining the polarization state comprises Fourier analysis of the interference-modulated intensity spectrum.

* * * * *

UNITED STATES PATENT AND TRADEMARK OFFICE
CERTIFICATE OF CORRECTION

PATENT NO.   : 6,490,043 B1
DATED        : December 3, 2002
INVENTOR(S)  : Paul Kebabian It is certified that error appears in the above-identified patent and that said Letters Patent is hereby corrected as shown below:

<u>Column 6,</u>
Line 30, replace the equation with:

$$E(\nu) \propto \int_{-\infty}^{\infty} \left[ \sum_{i=1}^{2} c_{i,1}\delta(t-\kappa_i) + c_{i,2}\delta(t+\kappa_i) \right] \exp(-2\pi j\nu t)dt$$

Signed and Sealed this

Twentieth Day of May, 2003

JAMES E. ROGAN
*Director of the United States Patent and Trademark Office*